United States Patent
Ho (10) Patent No.: US 7,917,381 B1
(45) Date of Patent: Mar. 29, 2011

(54) COMPENSATION SYSTEM FOR SELECTED PATHS IN HIERARCHICAL NETWORKS

(76) Inventor: Tsz-Tak Daniel Ho, Palo Alto, CA (US)

( * ) Notice: Subject to any disclaimer, the term of this patent is extended or adjusted under 35 U.S.C. 154(b) by 571 days.

(21) Appl. No.: 12/022,895

(22) Filed: Jan. 30, 2008

Related U.S. Application Data (60) Provisional application No. 60/899,065, filed on Feb. 2, 2007.

(51) Int. Cl.
  *G06Q 10/00* (2006.01)
  *G06Q 99/00* (2006.01)
  *G06F 21/00* (2006.01)
(52) U.S. Cl. .......... 705/7.12; 705/1.1; 705/59; 705/319
(58) Field of Classification Search .................. 705/1.1, 705/7, 59, 319
  See application file for complete search history.

(56) References Cited

U.S. PATENT DOCUMENTS

| | | | |
|---|---|---|---|
| 7,412,407 B1 * | 8/2008 | Cannella et al. | 705/26 |
| 7,734,551 B1 * | 6/2010 | Lindeman et al. | 705/59 |
| 2005/0234781 A1 * | 10/2005 | Morgenstern et al. | 705/26 |
| 2007/0043583 A1 * | 2/2007 | Davulcu et al. | 705/1 |
| 2007/0299933 A1 * | 12/2007 | Moon | 709/218 |
| 2008/0195470 A1 * | 8/2008 | Ferrer | 705/14 |
| 2009/0030774 A1 * | 1/2009 | Rothschild et al. | 705/10 |

FOREIGN PATENT DOCUMENTS

WO    WO 9847090 A1 * 10/1998

OTHER PUBLICATIONS

Sermo, www.sermo.com. Archived from www.archive.org, Jul. 2006-Oct. 2006.*
Vascellaro, Jassica, Social Networking Goes Professional, Aug. 23, 2007, Wall Street Journal.*

* cited by examiner

*Primary Examiner* — Fadey S Jabr
(74) *Attorney, Agent, or Firm* — North Shore Patents, P.C.; Michele Liu Baillie (57) ABSTRACT

A compensation system is provided which assigns compensations to nodes in specific paths within a hierarchical network. The system receives a task and a compensation method from an original poster and generates an original, uniquely identifiable posting, which can be viewed by various contacts. If any of these contacts is unwilling or unable to achieve the task, then they can generate a derived uniquely identifiable posting based on the original posting, which can then be viewed by one or more of their contacts. This process is repeated until an Nth level contact achieves the task, forming a hierarchical network of contacts with the original poster as a root node of the network. The contacts in the chain of contacts from the original poster to the achieving contact are compensated according to the stated compensation method. Contacts not in the achieving contact path are compensated differently from those in the path.

13 Claims, 9 Drawing Sheets

Last Name: Doe
First Name: John
Address: 10 NoSuch St., Paris, Texas
Password: ********

. . .

Email: johndoe@nosuch.com

Submit   Cancel

→ Submit →

John Doe,

Congratulation for registering.
Your User ID is: 612

Figure 5B

Task Posting

Successful hiring of the following personnel:
*Staff Accountant:*
This full time position will conduct reviews and Reconciliations of ledger balances, and special projects as assigned by the Controller. Must be proficient in AS-400 (Trueline), Microsoft Word and Excel.

*Qualifications:*
3+ years accounting experience. Experience with job cost maintenance, tracking and collection of notes receivable, property taxes, and other accounting tasks deemed necessary. Bachelor's degree in Accounting required. Must have strong fundamentals of accounting knowledge.

Compensation Method  Compensation

Equally divide among contact chain    $300

[Submit]  [Cancel]

Submit →

Posting ID:   101

Generated Link: http://nosuch.com/post?id=612101

[Submit]  [Cancel]

Figure 5C

Contact Original Poster:

User ID: 182

Message to Original Poster:

I am interested in the position of staff accountant. Attached please find my resume with my contact Information.

Attachment: resume.doc

Submit    Cancel

COMPENSATION SYSTEM FOR SELECTED PATHS IN HIERARCHICAL NETWORKS

CROSS-REFERENCE TO RELATED APPLICATIONS

This application claims priority to co-pending U.S. Provisional Patent application, entitled "Compensation System for Selected Paths in Hierarchical Networks", Ser. No. 60/899,065, filed on Feb. 2, 2007.

BACKGROUND

1. Field

The invention relates to online hierarchical networks, and more particularly to assigning compensation to nodes in specific paths within hierarchical networks.

2. Related Art

When a company or a person wants to achieve a certain task (such as selling an item, recruiting for a job position, etc.) using an online network, the strategy typically used is to post the objective on a web site (e.g. posting the sale of a car on an online forum or auction site, the sales of a house on real estate listing sites, or posting the job listing on an online job posting site, etc.) The poster hopes that someone stumbles across the posted objective, that this person tries to facilitate the achievement of the task either himself or by passing the task to a contact, and that eventually someone closes the transaction.

The entity may also use brokers to help find the person/entity who can ultimately help to close the transaction, and promise a compensation method for the broker. The broker will then use his/her own resources to find a buyer or job candidate depending on the objective for fulfilling the transaction. However, this method usually compensates only the broker, and does not generally compensate the broker's contacts who turned out not to be a suitable buyer or job candidate. The broker may ask the contact to provide his or her own contacts who may fulfill the transaction. This request is often refused or receives a lukewarm response because the contact does not get any benefit from facilitating the transaction.

Three examples of existing online models are shown below:

1. An online listing system is based on listing of the products on a web site, such as the sales of a business (e.g. ice cream store). Potential buyers or brokers can search the listings for attractive opportunities. The business owners may further engage brokers or tell their friends of the sale, and ask them to use their network to help facilitate the transaction. However, when the broker or the friend seeks out a potential buyer who is not interested, they often stop there and do not propagate the contact chain any further. It would be advantageous if the potential buyer can help to seek out other potential buyers for the friend or broker. However, the potential buyer who is not interested does not help because he or she does not receive any compensation for doing so.

2. Currently the model for online recruiting is based on job postings and resume database searches. While this is an obvious method, it is not very efficient in that it only compensates the job searchers and job posters. Sometimes, a company gives financial incentives to recruiters to actively go and look for job candidates for them. Nonetheless, the recruiters rely only on the contacts they have. If those contacts have no interest in the job, the recruiters usually ask the contacts to refer other candidates to them. However, most of the contacts deny knowing of other candidates or fail to follow up with the request, because they do not share in the compensation by giving out their contacts.

3. An online system which allows suppliers to list their excess inventories (e.g. empty seats on a flight, unsold inventories of plasma TV, etc.) anonymously on a web site, while potential buyers enter prices and types of inventories they are willing to pay into the system. If the price of the inventory of a supplier is below or matches the pricing criteria of the potential buyers, the potential buyers are then obligated to purchase the inventories from the particular supplier. This method requires potential buyers to have knowledge of the web site, and exhibit active interest in the available inventory. The suppliers may also engage brokers to sell the excess inventories by promising a fee for the brokers. The brokers may then contact their own contacts to facilitate a transaction. However, if the contacts are not interested, the message that the inventory is available does not get propagated further. Their contacts may refuse to refer other potential buyers to the brokers, or pass the message along themselves, since they would not be compensated for doing so.

Using the models listed above, the poster usually only gets as far as the efforts of the engaged contacts ($1^{st}$ level contact) since the poster does not compensate any further levels of contact ($2^{nd}$ level contacts, etc) for furthering the effort. To motivate the second level contacts and contacts of further levels to help facilitate the achievement of the task, the poster needs a mechanism to motivate contacts at all levels to allow the poster to leverage their contacts, and realize the full efforts of a network formed from the contact chain.

SUMMARY

A compensation system is provided which assigns compensations to nodes in specific paths within a hierarchical network. The system receives a task and a compensation method from an original poster and generates an original, uniquely identifiable, posting on the server. The original poster can then send the address of the original posting on the system to one or more first level contacts. These first level contacts can inspect the original posting and contact the original poster if they are interested in achieving the task. If any first level contact is unwilling or unable to achieve the task, then they can generate a derived, uniquely identifiable, posting based on the original posting, and send the address of the derived posting to one or more of their contacts. To get compensated, the first level contacts must register in the system in order to generate the derived posting. This process is repeated until an Nth level contact achieves the task. The first through Nth level contacts form a hierarchical network of contacts with the original poster as a root node of the network. The contacts in an achieving contact path are then compensated according to the stated compensation method of the original posting. The achieving contact path is the chain of contacts from the original poster to the achieving contact. In an exemplary embodiment, contacts in the network not in the achieving contact path are compensated differently, such as getting a smaller amount or not at all, than those in the contact path. In this manner, contacts at each level are motivated to propagate the contact chain to help facilitate the achievement of the task.

DETAILED DESCRIPTION

The online system described in this application allows an entity to state the task to be achieved and the compensation method if a hierarchy of contacts helped to facilitate achievement of the task. The entity will engage with selected contacts to act as brokers ($1^{st}$ level contacts), who will then contact their own contacts ($2^{nd}$ level contacts), and the process is repeated to form a hierarchical network. The task is ultimately achieved by one of the contacts in the network. All the contacts in the achieving contact path of the formed hierarchical network will be compensated according to the stated compensation method.

Figure 1:
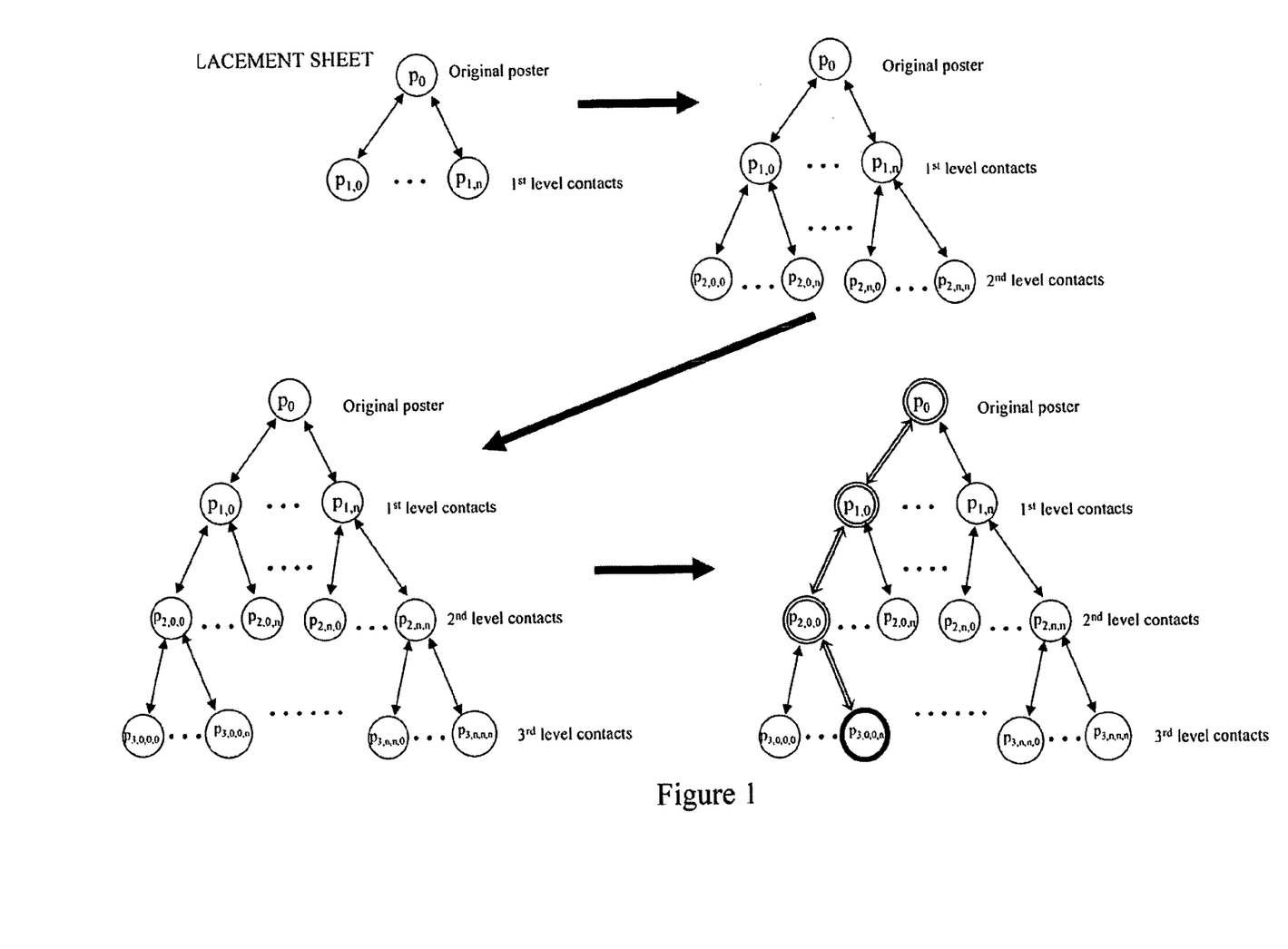
FIG. 1 illustrates the process of the inventive compensation system.

FIG. 1 illustrates the process of the inventive compensation system. The original poster ($p_0$) states the task and compensation method, which is then sent to the first level contacts ($p_{1,0}$ through $p_{1,n}$). A first level contact ($p_{1,0}$), if unable or unwilling to achieve the tasks, sends the task and compensation method to the second level contacts ($p_{2,0,0}$ through $p_{2,0,n}$). The process is then repeated to the third level contacts ($p_{3,0,0,0}$ through $p_{3,0,0,n}$) if the second level contact ($p_{2,0,0}$) is unable or unwilling to achieve the task. Ultimately, $p_{3,0,0,n}$ achieves the task, and the path of compensation is highlighted in concentric and bold circles. Each of the nodes in this path (i.e. $p_0$, $p_{1,0}$, $p_{2,0,0}$, $p_{3,0,0,n}$) will be compensated according to the stated compensation method. The compensation method can choose to compensate the original node ($p_0$) nothing, as it is the original poster.

In an exemplary embodiment, the compensation system is implemented in an online system with a software application on a server. The server hosts a web site through which the original poster can post the task. The application would receive from the original poster the end of path condition, i.e., the achievement of the task, and the compensation method. The application would preserve the node referencing information as each level of contact sends the address of the posting to the next level of contacts. When the task is achieved, the application determines the compensation based on cost functions of each node in the path to achievement of the task. In the exemplary embodiment, only the nodes in the achieving contact path are compensated, with the costs of all other nodes in the network being zero.

In the exemplary embodiment, smart agents can be deployed to parse through the contacts of a person and to cooperate with other smart agents of the parsed contacts. The smart agents automatically form a path to identify the best possible match for closing a transaction. The functions and types of smart agents would be different for different applications.

Figure 5A:
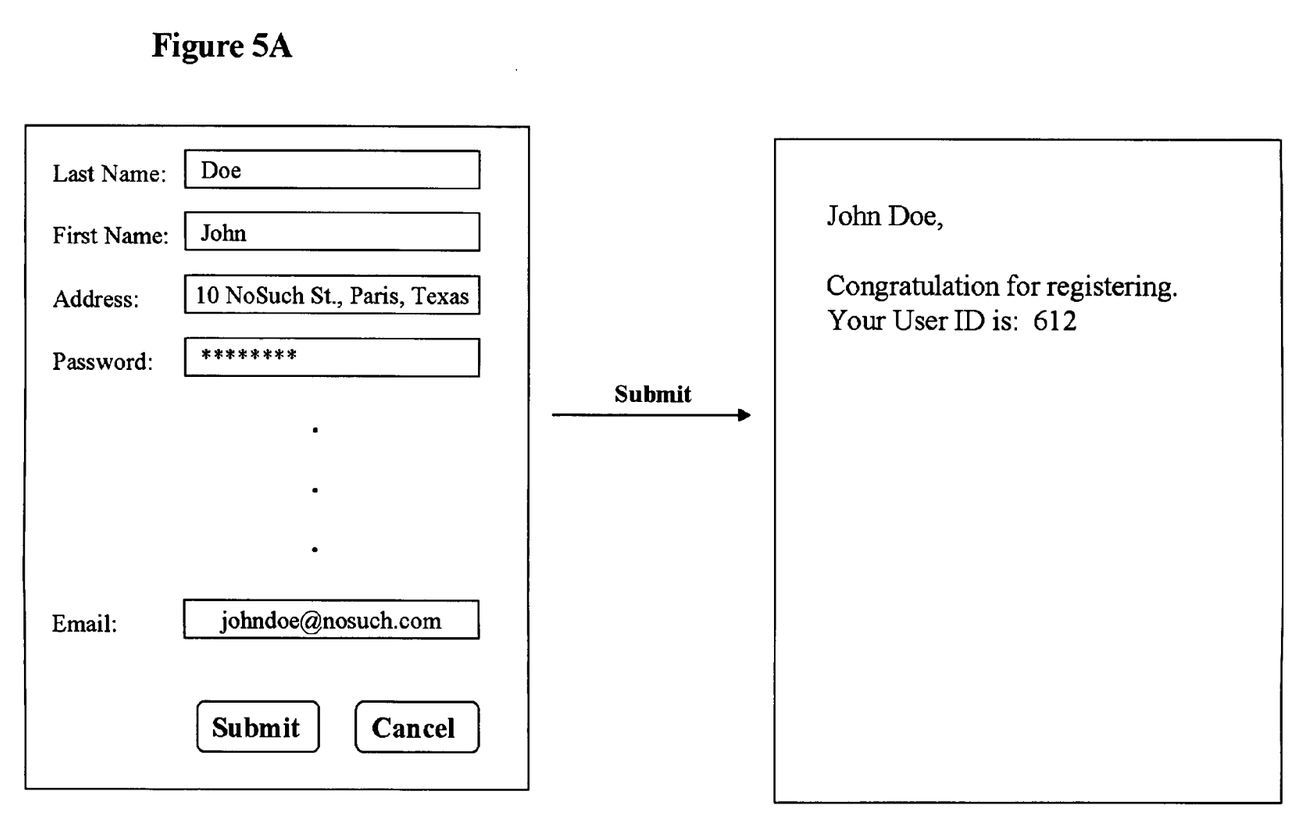
FIGS. 5A-5E illustrate example user interfaces for the exemplary compensation system.
Figure 5B:
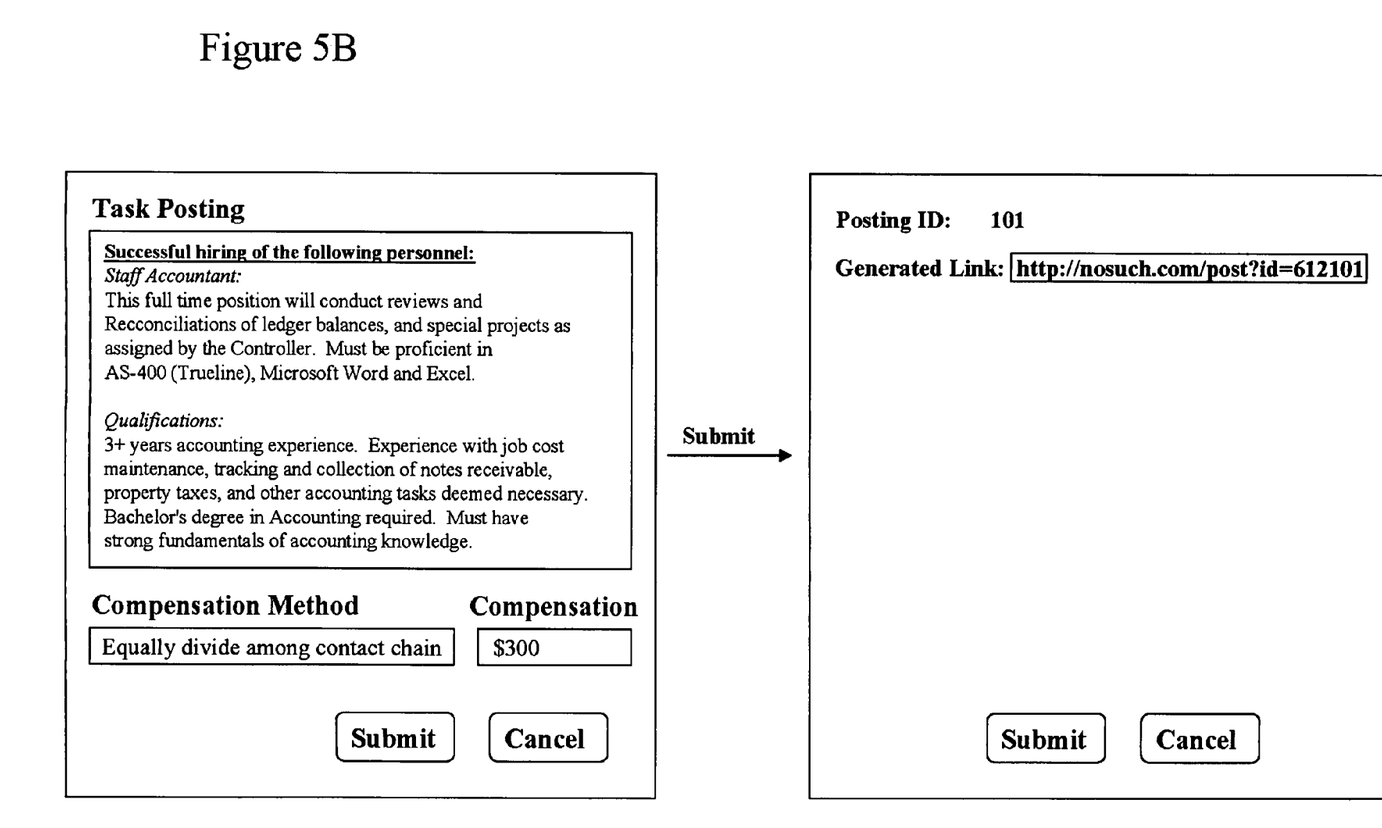

The operation of the exemplary compensation system is described in further detail below:

1. A posting (Original Posting) for a task to be achieved and the associated compensation method is registered with the compensation system by the original poster and receives an http link (original link) pointing to the posting. The link generated embeds the ownership and the posting reference information. This ownership and reference information may not be apparent in the link as the address can be scrambled using various encoding or encryption methods such as checksum encoding, private or public key encryption, etc., while ownership and posting reference information can be deciphered later. FIGS. 5A and 5B illustrate example user interfaces for the original poster to register with the compensation system and for posting the task and associated compensation method, respectively.

Figure 5C:
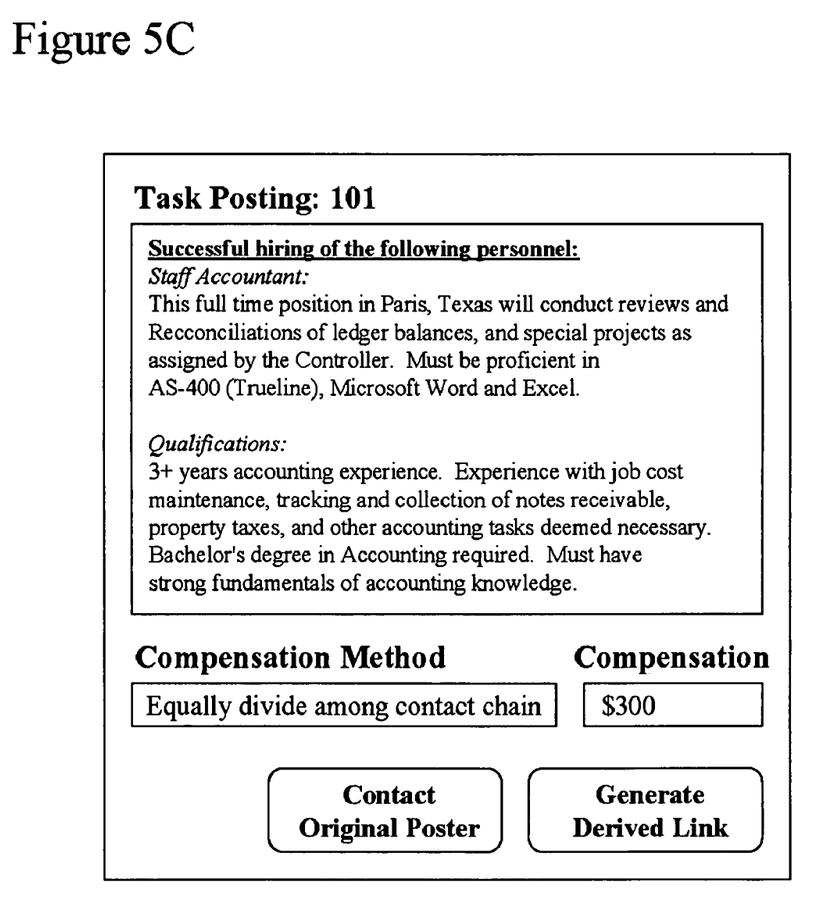

2. The posting in the form of an http link can then be sent (Level I sending) to multiple candidates or recruiters ($1^{st}$ level contacts). The link can also be posted on an online posting board, pasted on any web page, or recorded in any recording media so others can use the link information to see the posting. FIG. 5C illustrates an example user interface of the posting as observed by a candidate or recruiter.

Figure 5D:
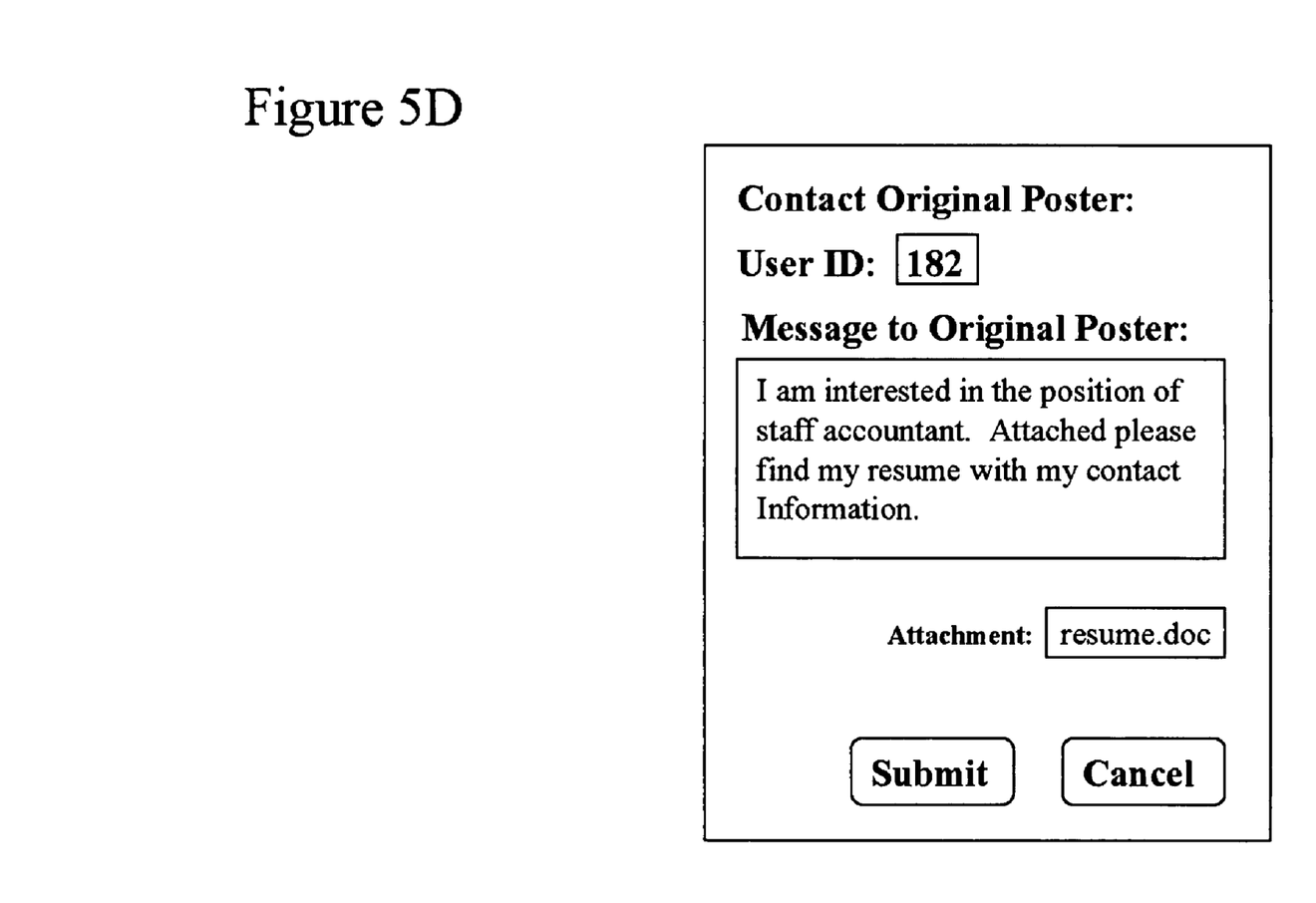

3. If one of the $1^{st}$ level contacts is interested in achieving the task, he/she can use the address information to reference information of the original posting and be able to contact the original poster by registering in the system. A server will validate and, from information embedded in the link, infer that contact is made between Original Poster and the contact receiving the link. FIG. 5D illustrates an example user interface for contacting the original poster.

Figure 5E:
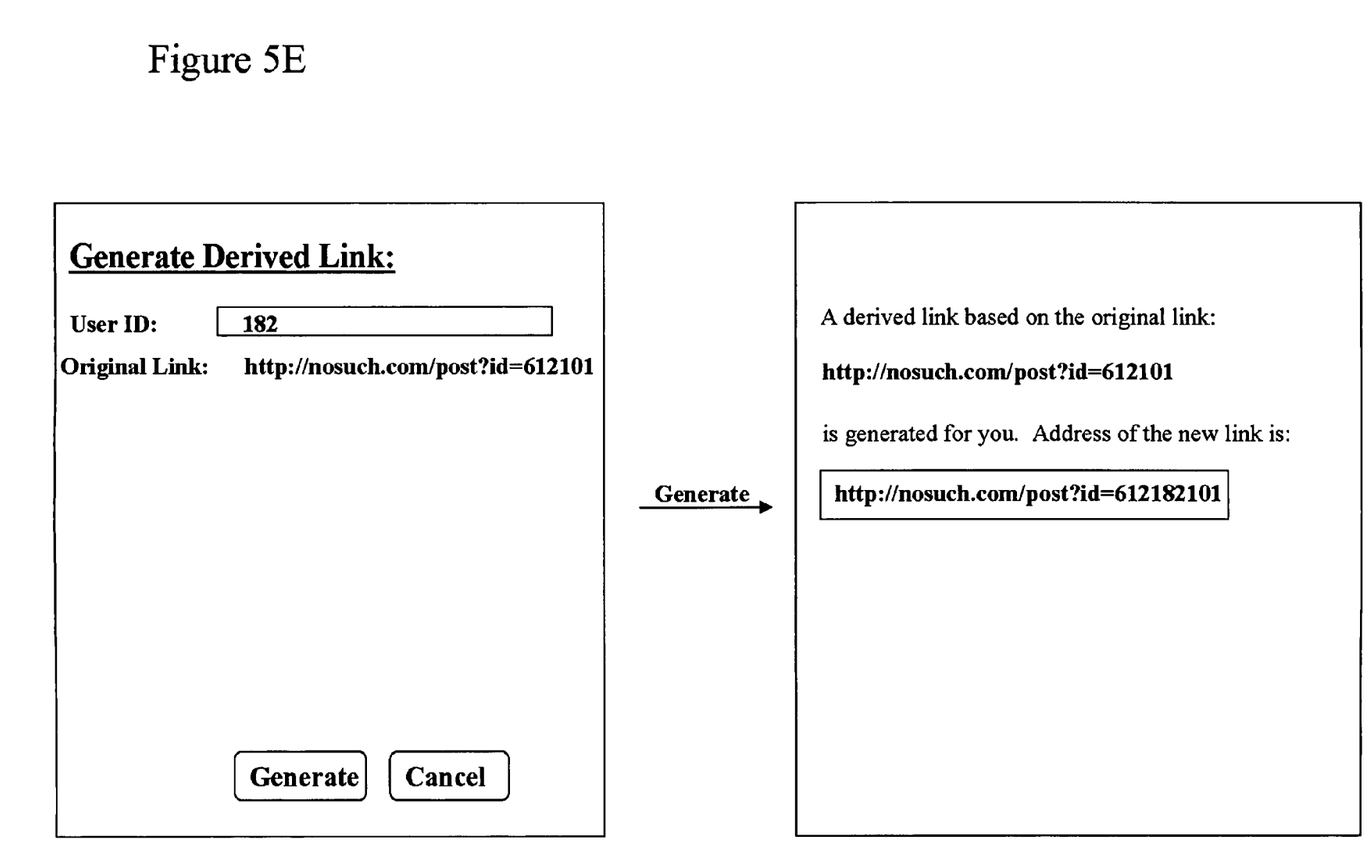

4. If any of the $1^{st}$ level contacts are not interested in achieving the task, they can register in the system by providing the links they received and generate derived links ($2^{nd}$ level links) which can be sent out to their own contacts ($2^{nd}$ level contacts). The derived link can also be posted on an online posting board, pasted on any web page, or recorded in any recording media so others can use the link information to reference the posting. The derived links will reference the same information of the original posting, and will also contain information of the hierarchical relationship to the original poster, and the current chain of contacts who generated the link. The contact chain and posting reference information may not be apparent in the link as the address can be scrambled using various encoding or encryption methods such as check sum encoding, hash table referencing, etc., while ownership and posting reference information can be deciphered later. FIG. 5E illustrates an example user interface for generating the derived link.

5. $2^{nd}$ level contacts will then repeat step 3 to spread the news to their own contacts and reach many levels of contacts, or post the link elsewhere.

6. Ultimately one of the people or entities ($N^{th}$ level contacts) who receives the posting notice helps to achieve the task (e.g. buying an item from original poster, filling the job position, etc.) and closes the transaction.

7. A hierarchical relationship (path) is established between the original poster and the ultimate person who achieves the task (Nth level contacts).

8. Each person represented by the nodes in the achieving contact path, except the original poster, is compensated according to the stated compensation method.

Figure 2:
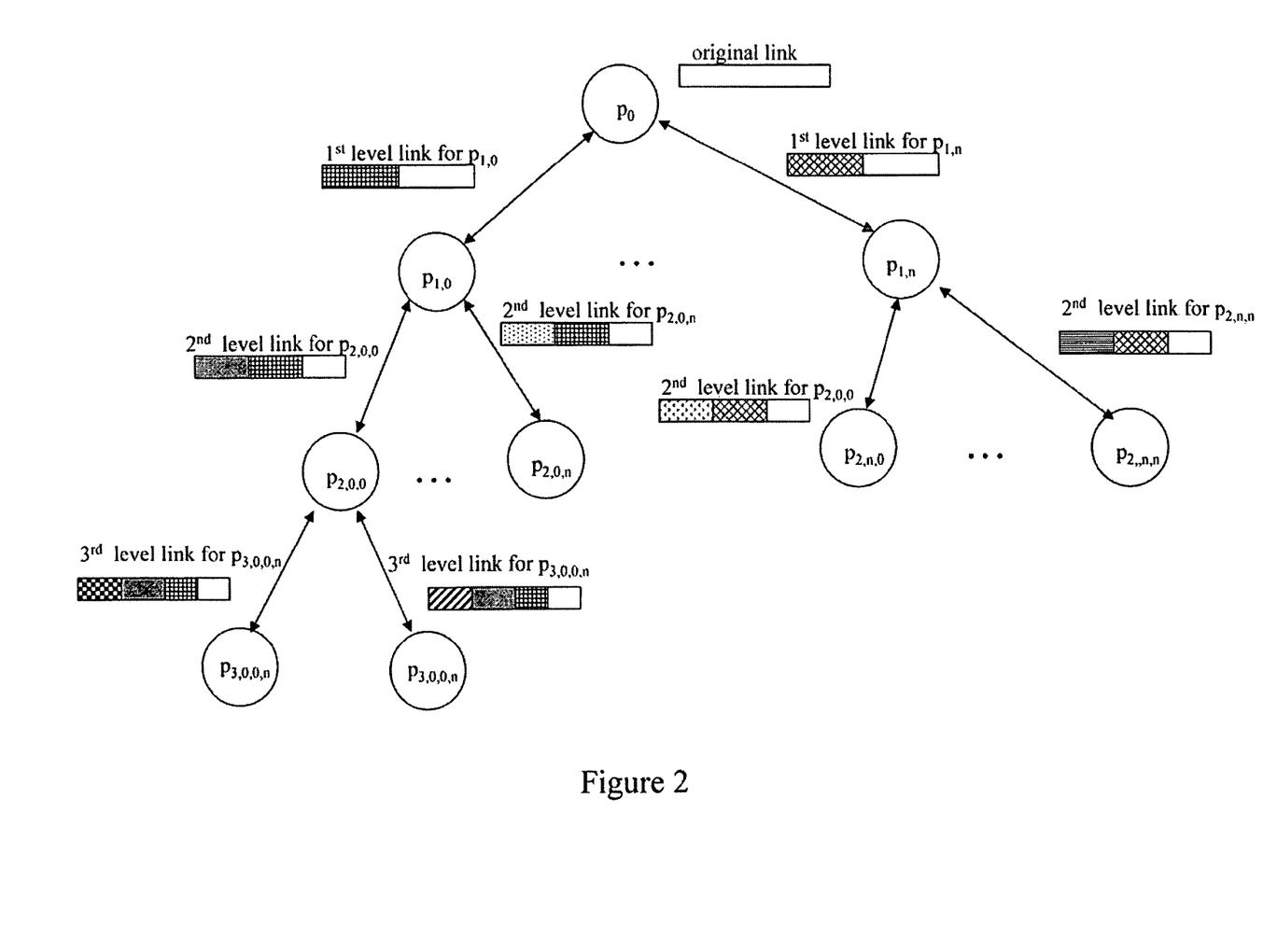
FIG. 2 illustrates the relationship between the different level of contacts and the referencing information of the links of which each node will use.

FIG. 2 illustrates the relationship between the different level of contacts and the links each node will use. It is illustrated such that each link contains the fill pattern of the parent link, and a new fill pattern which identifies the receiver of the link. It is illustrated to show that the link can be deciphered to obtain the hierarchical relationship between the individual node and the original poster.

Figure 3:
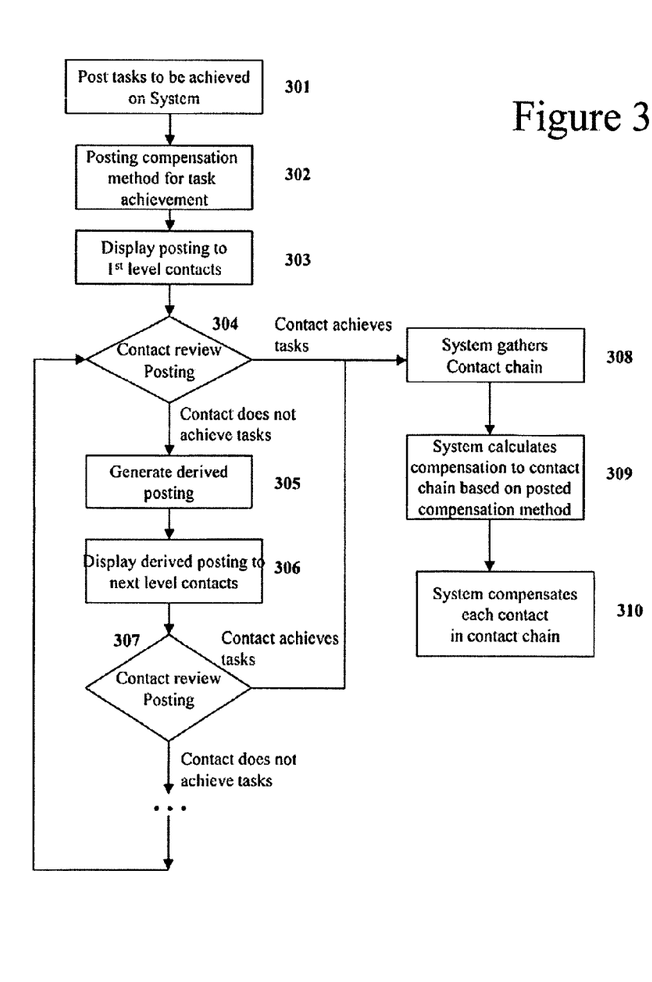
FIG. 3 is a flowchart illustrating the decision flow of contacts at different levels.
Figure 4:
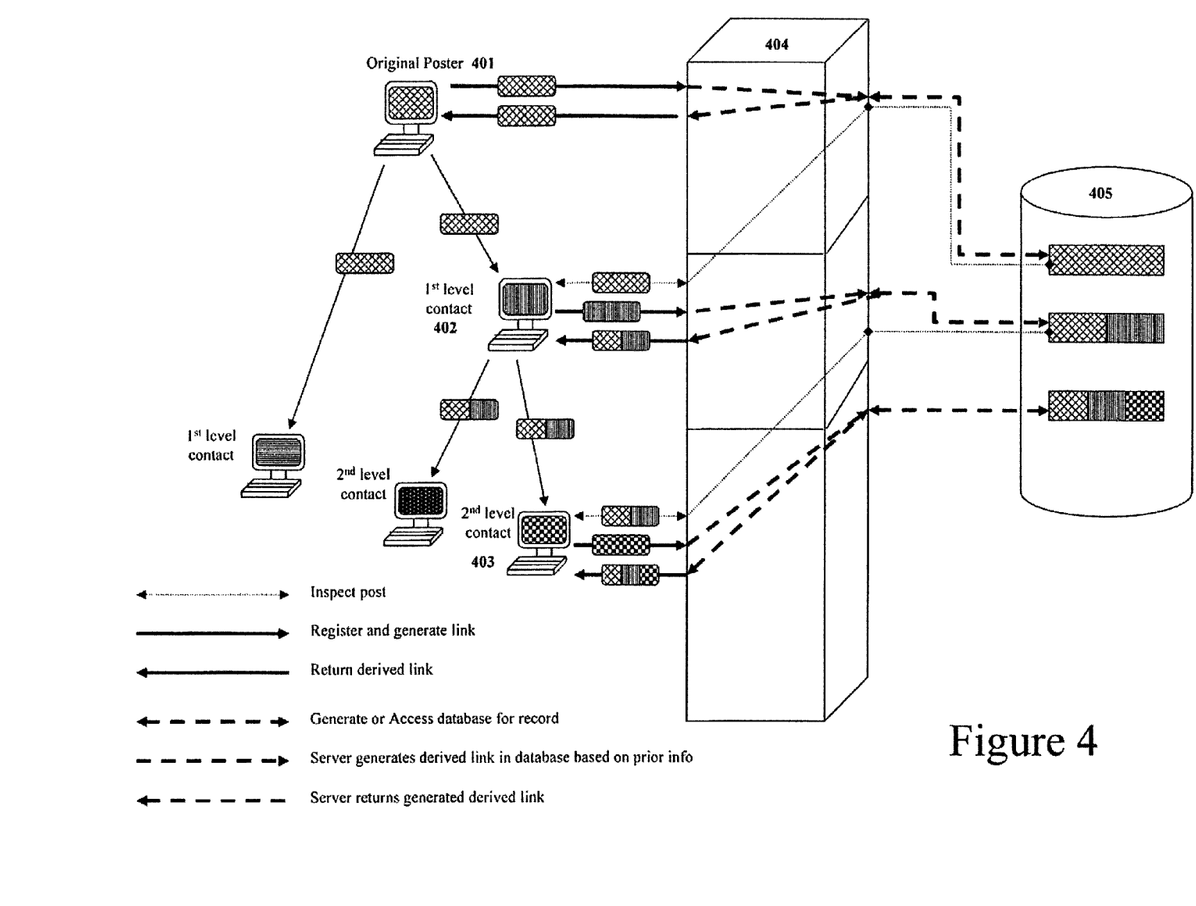
FIG. 4 is a block diagram showing an exemplary embodiment of the compensation system.

FIG. 3 is a flow chart showing the decision flow of contacts at different levels. FIG. 4 is a block diagram illustrating an exemplary compensation system. The system includes an original poster 401, a server 404 which hosts a web site, and a database 405. Referring to both FIGS. 3 and 4, the original poster 401 posts the task to be achieved and the compensation method on the system (steps 301 and 302). The task and compensation method are registered with a server 404, which generates a corresponding link. A record in a database 405 is generated for the link, and the server 404 returns the link to the original poster 401. The posting is displayed to the original poster's first level contacts 402 (step 303).

Each first level contact reviews or inspects the posting (step 304). If the contact does not achieve the task, then a derived posting is generated (step 305). In creating the derived posting, the first level contact 402 registers a link with the server 404, which generates a corresponding derived link based on prior information, i.e., information on the original poster. A record in the database 405 is generated for the derived link. The server 404 returns the derived link to the first level contact 402. The derived posting is then displayed to the next level contacts 403 (step 306).

Each next level contact 403 reviews the derived posting (step 307) and determines if he/she is willing or able to achieve the task. Steps 304 through 307 are repeated until a contact achieves the task.

When a contact achieves the task, the system gathers the achieving contact path (step 308). The system calculates compensations to the contacts in the achieving contact path based on the posted compensation method (step 309). The system then compensates each contact in the achieving contact path (step 310). Other contacts in the hierarchical network formed may also be compensated differently from those in the contact path.

Although the exemplary embodiment described above illustrates contacts as nodes, the compensation system can be used to facilitate any number of applications, including but not limited to:

Listing system (e.g., selling a business);

Recruiting system (e.g., recruiting for permanent jobs, consultants, actors/actresses, experts, etc.);

Sales of merchandize (e.g., the whole chain is compensated if buyers buy the goods from the seller; the chains which referred buyers to buy Hi-Fi systems from a company will be compensated);

Subscription service (e.g., subscription of magazines, cable services, healthcare services, online content subscriptions, online dating services subscriptions, etc.);

Finding vendors or suppliers (e.g. getting a vendor to supply products or services at a certain price);

Financial transaction (e.g. raising capital, underwriting, etc.);

Real estate transaction (e.g. selling real estate, finding rental tenants, etc.);

Locating an item (e.g., finding and buying a rare stamp);

Locating a person (e.g., finding a remote cousin, past lover, or classmate);

Provisioning of a service (e.g., solving a stated problem, answer a question, etc.);

Cooperation to facilitate a service (e.g., routing of a physical item through a physical network, routing of media content or other electronic information through a communications network);

Franchising (e.g. posting to look for franchisees or franchisors);

Content delivery (e.g., posting to sell intangible merchandize, such as videos, music, etc.);

Dating service (e.g., posting to locate a companion).

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following or as amended or added in this or related application.

I claim:

1. A computer implemented method for providing a compensation system for selected paths in a hierarchical network, comprising:
    (a) receiving a task and a compensation method from an original poster by a server;
    (b) generating by a server an original posting for the task;
    (c) sending an address of the original posting by the server to one or more next level contacts of the original poster, wherein the address of the original posting uniquely identifies the original posting as being from the original poster;
    (d) for each given next level contact unwilling or unable to achieve the task, generating by the server a derived posting based on the posting sent to the given next level contact, wherein an address of the derived posting uniquely identifies the derived posting as being from the original poster, the given next level contact, and each intervening contact between the original poster and the given next level contact;
    (e) for each given next level contact unwilling or unable to achieve the task, sending the address of the derived posting by the server to one or more next level contacts of the given next level contact;
    (f) repeating by the server the generating (d) and sending (e) for each given next level contact unwilling or unable to achieve the task until an Nth level contact achieves the task;
    (g) determining by the server an achieving path from the address of the posting sent to the Nth level contact, wherein the achieving path comprises the original poster, the Nth level contact, and each intervening contact between the original poster and the Nth level contact who was unwilling or unable to achieve the task; and
    (h) compensating by the server each contact in the achieving contact path according to the compensation method, wherein contacts not in the achieving task are not compensated according to the compensation method.

2. The method of claim 1, wherein the original poster, the next level contacts, and the Nth level contact form a hierarchical network of contacts with the original poster as a root node of the network.

3. The method of claim 1, wherein the compensation method is based on cost functions of each contact in the achieving contact path.

4. The method of claim 1, wherein the original posting comprises ownership and posting reference information.

5. The method of claim 1, wherein the sending (c) comprises:
    (c1) displaying by the server information of the original posting when the address of the original posting is accessed.

6. The method of claim 1, wherein the sending (c) comprises:
    (c1) posting the address of the original posting by the server; and
    (c2) displaying by the server information of the original posting when the address of the original posting is accessed.

7. The method of claim 1, wherein the sending (e) comprises:

(e1) displaying by the server information of the derived posting when the address of the derived posting is accessed.

8. The method of claim 1, wherein the sending (e) comprises:
(e1) posting the address of the derived posting by the server; and
(e2) displaying by the server information of the derived posting when the address of the derived posting is accessed.

9. The method of claim 1, wherein the derived posting comprises:
information for the original posting;
information of a hierarchical relationship between the given next level contact and the original poster; and
the intervening contacts between the original poster and the given next level contact.

10. The method of claim 1, wherein the compensating (h) comprises:
(h1) deciphering by the server the derived posting sent to the Nth level contact to obtain information for the contacts in the achieving path and the original posting; and
(h2) compensating by the server each contact in the achieving path according to the compensation method.

11. The method of claim 1, wherein the task comprises one or more of the following:
a transaction in a listing system;
a transaction in a recruiting system;
a sale of merchandize;
a sale of a subscription service;
finding a vendor or supplier;
a financial transaction;
a real estate transaction;
locating an item;
locating a person;
provisioning of a service;
facilitating a service;
franchising;
content delivery; and
dating service.

12. A computer readable non-transitory medium with program instructions for providing a compensation system for selected paths in a hierarchical network, comprising the instructions for:
(a) receiving a task and a compensation method from an original poster;
(b) generating an original posting, for the task;
(c) sending an address of the original posting to one or more next level contacts of the original poster, wherein the address of the original posting uniquely identifies the original posting as being from the original poster;
(d) for each given first level contact unwilling or unable to achieve the task, generating a derived posting based on the posting sent to the given next level contact, wherein an address of the derived posting uniquely identifies the derived posting as being from the original poster, the given next level contact, and each intervening contact between the original poster and the given next level contact;
(e) for each given next level contact unwilling or unable to achieve the task, sending the address of the derived posting to one or more next level contacts of the given next level contact;
(f) repeating generating (d) and sending (e) for each given next level contact unwilling or unable to achieve the task until an Nth level contact achieves the task;
(g) determining an achieving path from the address of the posting sent to the Nth level contact, wherein the achieving path comprises the original poster, the Nth level contact, and each intervening contact between the original poster and the Nth level contact who was unwilling or unable to achieve the task; and
(h) compensating each contact in an achieving contact path according to the compensation method, wherein contacts not in the achieving path are not compensated according to the compensation method.

13. A compensation system, comprising:
a server for hosting a web site, wherein an original poster posts a task on the web site, wherein the server:
receives the task and a compensation method from the original poster,
generates an original posting for the task,
sends an address of the original posting to one or more next level contacts of the original poster, wherein the address of the original posting uniquely identifies the original posting as being from the original poster,
for each given next level contact unwilling or unable to achieve the task, generates a derived posting based on the posting sent to the given next level contact, wherein an address of the derived posting uniquely identifies the derived posting as being from the original poster, the given next level contact, and each intervening contact between the original poster and the given next level contact,
for each given next level contact unwilling or unable to achieve the task, sends the address of the derived posting to one or more next level contacts of the given next level contact,
repeats the generates and sends for each next level contact unwilling or unable to achieve the task until an Nth level contact achieves the task,
determines an achieving path from the address of the posting sent to the Nth level contact, wherein the achieving path comprises the original poster, the Nth level contact, and each intervening contact between the original poster and the Nth level contact who was unwilling or unable to achieve the task, and
compensates each contact in the achieving path, wherein contacts not in the achieving task are not compensated according to the compensation method.

* * * * *